No. 858,779. PATENTED JULY 2, 1907.
L. W. BARBER.
SIDE BEARING FOR CARS.
APPLICATION FILED MAR. 24, 1905.
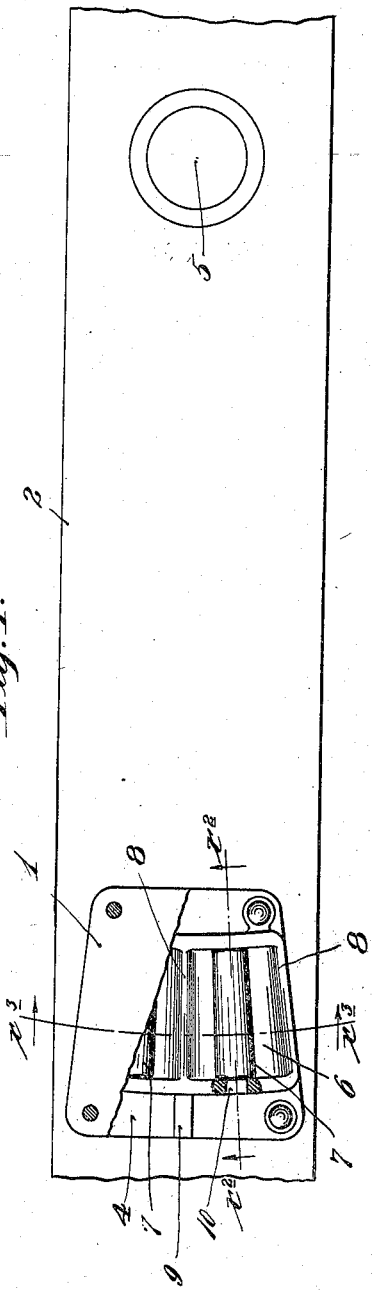
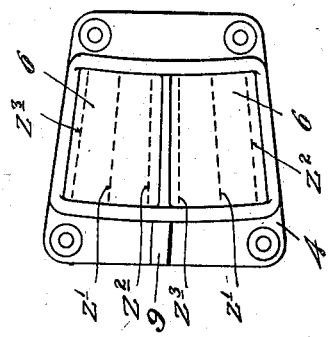
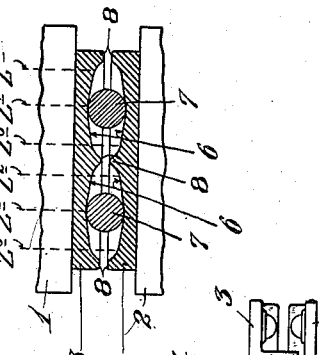
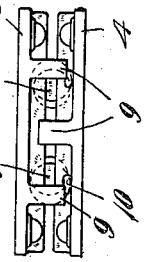
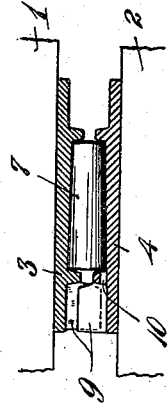
Witnesses.
E. W. Jeppesen,
A. H. Opsahl.
Inventor.
Lee W. Barber.
By his Attorneys.
Williamson Merchant

UNITED STATES PATENT OFFICE.

LEE W. BARBER, OF CHICAGO, ILLINOIS.

SIDE BEARING FOR CARS.

No. 858,779.  Specification of Letters Patent.  Patented July 2, 1907.

Application filed March 24, 1905. Serial No. 251,741.

*To all whom it may concern:*

Be it known that I, LEE W. BARBER, a citizen of the United States, residing at Chicago, in the county of Cook and State of Illinois, have invented certain new and useful Improvements in Side Bearings for Cars; and I do hereby declare the following to be a full, clear, and exact description of the invention, such as will enable others skilled in the art to which it appertains to make and use the same.

My invention has for its object to provide an improved side bearing for cars and to this end it consists of the novel devices and combination of devices hereinafter described and defined in the claims.

In the accompanying drawings which illustrate the invention like characters indicate like parts throughout the several views.

Figure 1 is a plan shown with some parts broken away, illustrating my improved side bearing, applied in working position, the car bolster being removed. Fig. 2 is a transverse truck section taken on line $x^2 \, x^2$ of Fig. 1. Fig. 3 is a vertical section taken on line $x^3 \, x^3$ of Fig. 1. Fig. 4 is detail in elevation looking at the outer end portion of the improved side bearing, said side bearing being removed from working position; and Fig. 5 is a plan view looking at the face of the lower part of the side bearing.

The numeral 1 indicates the car bolster and the numeral 2 indicates the truck bolster, portions only of each are shown in drawings.

The numeral 3 indicates the upper part, and the numeral 4 indicates the lower part of the improved side bearing, which parts are adapted to be bolted or otherwise rigidly secured, the former to the car bolster 1, and the latter to the truck bolster 2. These side bearings are of course applied near the sides of the car, at a proper distance from the pivotal center of the truck bolster 2, at which pivotal center the usual king bolt 5 is applied in the usual way.

The members 3 and 4 are formed with outwardly converging depressions that afford roller seats 6, which roller seats 6 converge toward the axis of the king bolt 5, and are adapted to receive between them, that is between the upper and lower vertically alined seats, slightly conical bearing rollers 7, which rollers are adapted to fit the vertical flare of the upper and lower seats. Said seats 6, transversely of the rollers, have a flare, that is, of course, much greater than the peripheral curve of the rollers.

As a leading feature of this invention the roller seats 6 are formed with flat bearing surfaces, that diverge from a horizontal plane in opposite directions from the central portions of said seats. For instance, in Figs. 3 and 5 the dotted line marked $Z^1$ indicates the central portion of the seat, and the outwardly flaring diverging surfaces between these center lines and the dotted lines marked $Z^2$ and $Z^3$ are flat. The surface between the lines $Z^1$ and $Z^2$ flares with respect to the flat surface between the lines marked $Z^1$ and $Z^3$. The extremities of the seats beyond the lines $Z^2$ and $Z^{3'}$ are rounded to fit the conical surface of the rollers, thereby leaving radial stop ribs 8 between the two roller seats and at the outer edges of the said two roller seats. The flat surfaces of the two lower roller seats flare upward in respect to the horizontal plane, while the plate bearing surfaces of the upper roller seats flare downward with respect to the horizontal plane. The bearing members 3 and 4 are preferably formed with interlapping stop lugs 9, at their outer extremities, which limit the extreme movements of the two bearing members, the one with respect to the other.

In side bearings for cars, two features are very desirable, to-wit:—Capability of a long oscillatory movement of the truck bolster with respect to the car bolster, so as to permit the trucks to adapt themselves to extreme curves in a track; and second, a tendency to maintain the truck bolster and the car bolster in the same vertical plane, so that when running on a straight track the car trucks will be kept in a straight line with the body of the car. With these arrangements of the bearing surfaces of the roller seats, it results that in any of the possible positions of the rollers, a given amount of pivotal movement of the one center bearing member with respect to the other, will cause the same amount of rise of the rollers, and consequently such movement will take place under the constant resistance, as distinguished from the accelerated resistance, such as would take place were cylindrical or curved seats to be employed. It therefore also follows that the amount of pivotal movement which may be permitted to the one bearing member, with respect to the other, is not limited by the form of the roller bearing seats and may be increased to any extent found desirable or preferable, other things being considered. Preferably the flanges at the outer lower portions of the roller seats of the lower bearing member 4, are perforated at 10, so as to permit sand and dirt to work out of the said seats, under the action of the rollers.

Attention is here called to the fact that when the trucks move pivotally with respect to the car body, the car body will be raised pivotally, so as to relieve the center bearing between the truck bolster and car bolster from friction. This makes the return of the trucks to positions parallel with the car body an easy matter, under action of the weight of the load on the improved side bearings.

What I claim and desire to secure by Letters Patent of the United States, is as follows:—

The combination with upper and lower members of a side bearing, said members having radially disposed roller seats and interlapping stop lugs, of loose laterally spaced conical rollers working between the corresponding upper and lower seats of said members, substantially as described.

In testimony whereof I affix my signature in presence of two witnesses.

LEE W. BARBER.

Witnesses:
L. W. BARBER,
A. M. LOVE.